United States Patent

Busacchi

[11] Patent Number: 6,007,315
[45] Date of Patent: Dec. 28, 1999

[54] APPARATUS FOR MOLDING A PLASTIC SEAL INSIDE A CLOSURE FOR CLOSING A CONTAINER

[75] Inventor: Pietro Busacchi, Bologna, Italy

[73] Assignee: Sacmi Cooperative Meccanici Imola S.c.r.l., Imola, Italy

[21] Appl. No.: 08/955,969

[22] Filed: Oct. 22, 1997

[30] Foreign Application Priority Data

Oct. 24, 1996 [IT] Italy .................................. B096A0538
Oct. 24, 1996 [IT] Italy .................................. B096A0539

[51] Int. Cl.⁶ ....................................................... A23G 1/22
[52] U.S. Cl. ...................... 425/110; 425/126.1; 425/127; 425/809; 264/268
[58] Field of Search .................................. 425/126.1, 127, 425/129.1, 557, 560, 809, 110, 114; 264/268

[56] References Cited

U.S. PATENT DOCUMENTS

| 2,772,012 | 11/1956 | Crabtree . | |
|---|---|---|---|
| 3,038,507 | 6/1962 | Smith . | |
| 3,135,019 | 6/1964 | Aichele | 425/126.1 |
| 3,360,148 | 12/1967 | Owen . | |
| 3,407,442 | 10/1968 | Wright . | |
| 3,827,843 | 8/1974 | Blouch | 425/127 |
| 4,312,824 | 1/1982 | Mori et al. | 264/135 |
| 4,412,797 | 11/1983 | Murayama | 425/114 |
| 5,123,824 | 6/1992 | Alieri | 425/126.1 |

FOREIGN PATENT DOCUMENTS

| 0 012 314 | 6/1980 | European Pat. Off. . | |
|---|---|---|---|
| 0 037 651 | 10/1981 | European Pat. Off. . | |
| 2 301 377 | 2/1975 | France | 425/560 |
| 2 312 353 | 12/1976 | France . | |
| 437 016 | 11/1967 | Switzerland . | |
| 2 294 896 | 5/1996 | United Kingdom . | |
| 95 32086 | 11/1995 | WIPO . | |

*Primary Examiner*—Jan H. Silbaugh
*Assistant Examiner*—Stefan Staicovici
*Attorney, Agent, or Firm*—Guido Modiano; Albert Josif; Daniel J. O'Byrne

[57] ABSTRACT

Apparatus for molding a plastic seal inside a closure for closing a container, having a line for transferring the closures through a closure heating station, a station for dispensing and preforming plastic material in the pasty state, suitable to deposit a dose of material inside a respective closure and preform each dose dispensed inside each closure in an annular configuration, and a final forming station, in which the preformed annular dose is molded so as to form the final seal inside the closure.

13 Claims, 9 Drawing Sheets

6,007,315

1

APPARATUS FOR MOLDING A PLASTIC SEAL INSIDE A CLOSURE FOR CLOSING A CONTAINER

BACKGROUND OF THE INVENTION

The present invention relates to an apparatus for molding a plastic seal inside a closure for closing a container. The apparatus is particularly suitable for molding an annular seal inside a closure with a so-called "twist-off" opening.

Devices for molding a seal inside a closure are known for example from European Patents 37,651 and 462,513. In these devices, the seal is produced by depositing a dose of plastic material in the pasty state inside the closure and by compressing said dose with a punch, so as to form a layer which covers the bottom of the closure. Conventional devices are suitable for small closures, such as for example crown caps; in the case of much larger closures, the described system has limitations caused by the difficulty of forming a uniform layer, also in view of the fact that an annular expansion, against which the rim of the container must be hermetic, is generally required along the peripheral region of the closure.

Moreover, the pressure required to compress the material until it covers the bottom of the closure becomes excessive and can cause deformations or damage to the closure. Accordingly, seals in large closures are manufactured with devices which work with plastic materials in the semifluid state which, after being deposited inside the closure, is spread so as to cover the bottom by spinning the closure. However, these devices have a very low capacity and have limitations as regards the use of certain plastic materials, particularly thermoplastic materials. Moreover, it is not possible to produce seals having a differentiated cross-section.

SUMMARY OF THE INVENTION

The aim of the present invention is to provide an apparatus which allows to mold a plastic seal inside a closure, also in the case of a large closure, without causing the drawbacks observed in conventional devices.

This aim is achieved with an apparatus whose characteristics are defined in the appended claims.

BRIEF DESCRIPTION OF THE DRAWINGS

Further characteristics and advantages of the present invention will become apparent from the following detailed description on the basis of the accompanying drawings, wherein, by way of example.

DESCRIPTION OF THE PREFERRED EMBODIMENTS

Figure 1:
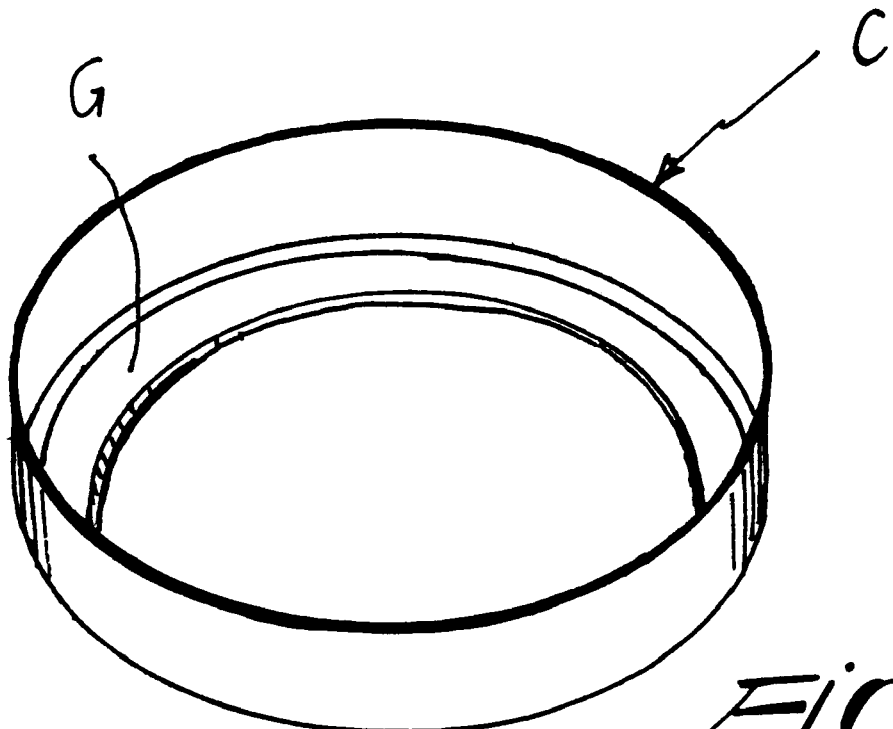
FIGS. 1 and 2 are respectively a perspective view and a sectional view of a closure for closing a container provided with a seal which can be applied with the apparatus according to the present invention.
Figure 2:
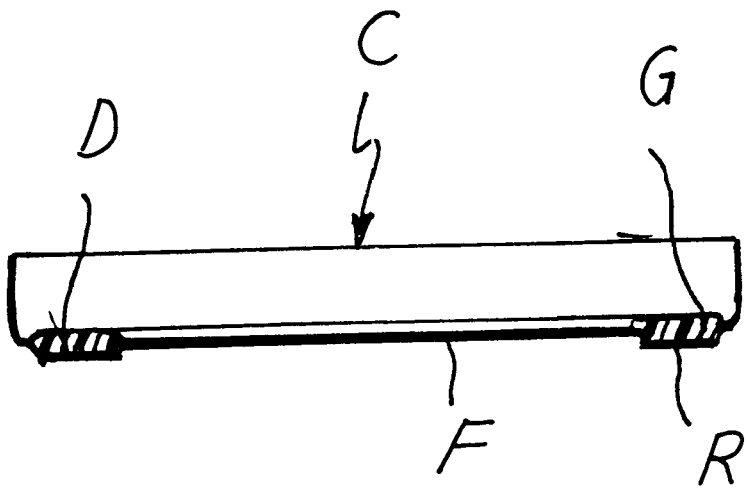

With reference to FIGS. 1 to 7, the apparatus comprises a conveyor, generally designated by the reference numeral 1,

2 for transferring closures C. In the case of the illustrated example, the closures C are constituted by caps of the kind used to close jars, including rather large ones, and have a flat bottom F in which an annular peripheral protrusion R is provided which internally forms an annular recess D, in which an annular seal G, made of suitable plastics, is applied by molding by means of the apparatus according to the present invention. The recess D can of course also be omitted.

The conveyor 1 (see FIG. 3) is composed of a first pair of pulleys 2 and of a second pair of pulleys 3, whereon two respective toothed belts 4 are wound in a closed loop. The belts 4 are connected by equidistant cross-members 5 which act as pushers for the advancement of the closures C. The pairs of pulleys 2, 3 are keyed on respective shafts 6, 7: the shaft 7 is assumed to be driven by a motorization unit, described hereinafter, for the intermittent advancement of the belts 4 in the direction A. The advancement stroke of the belts is equal to the distance between the cross-members 5.

Figure 5:
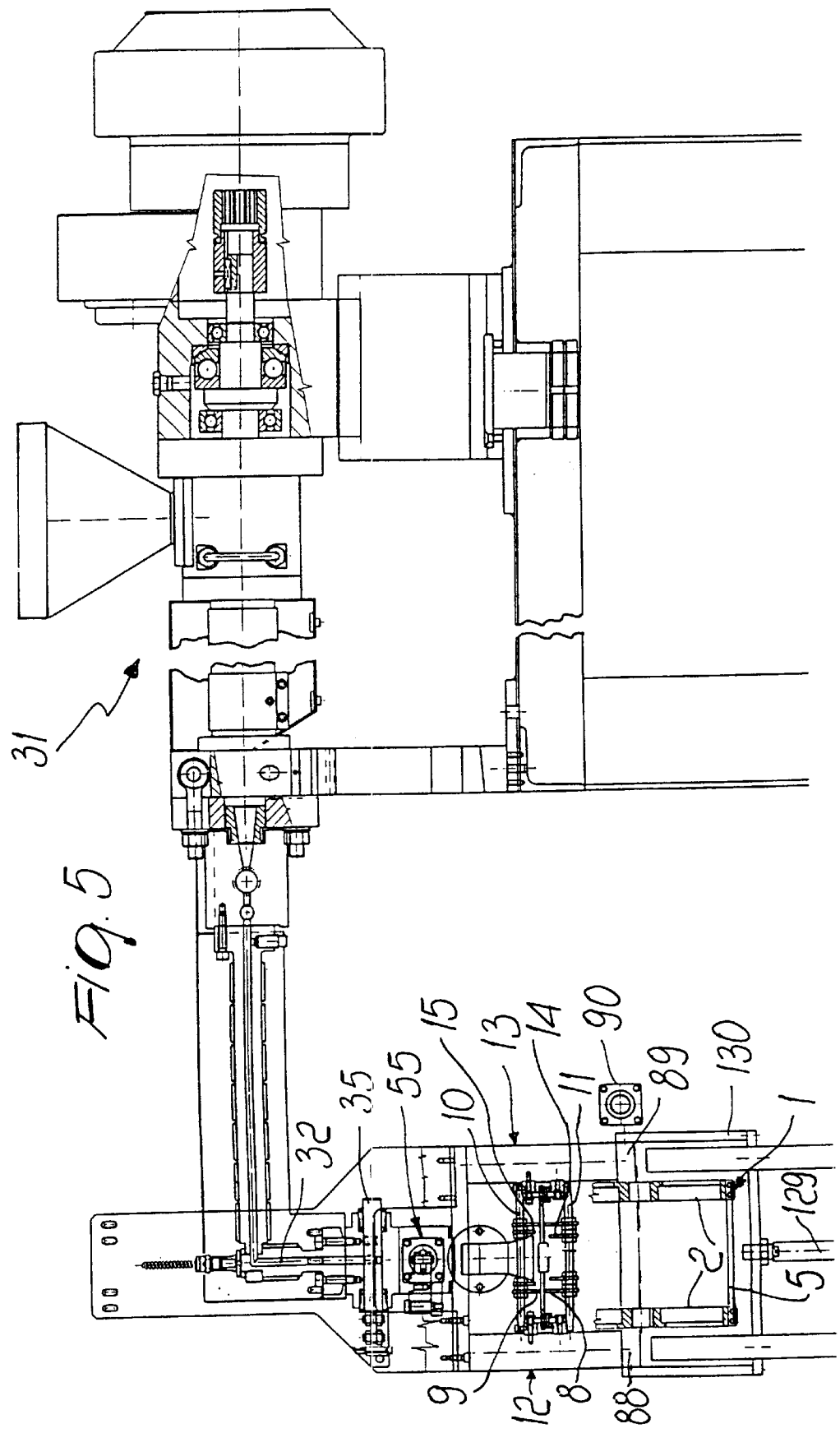
FIG. 5 is a sectional view, taken along the plane V—V of FIG. 3.
Figure 6:
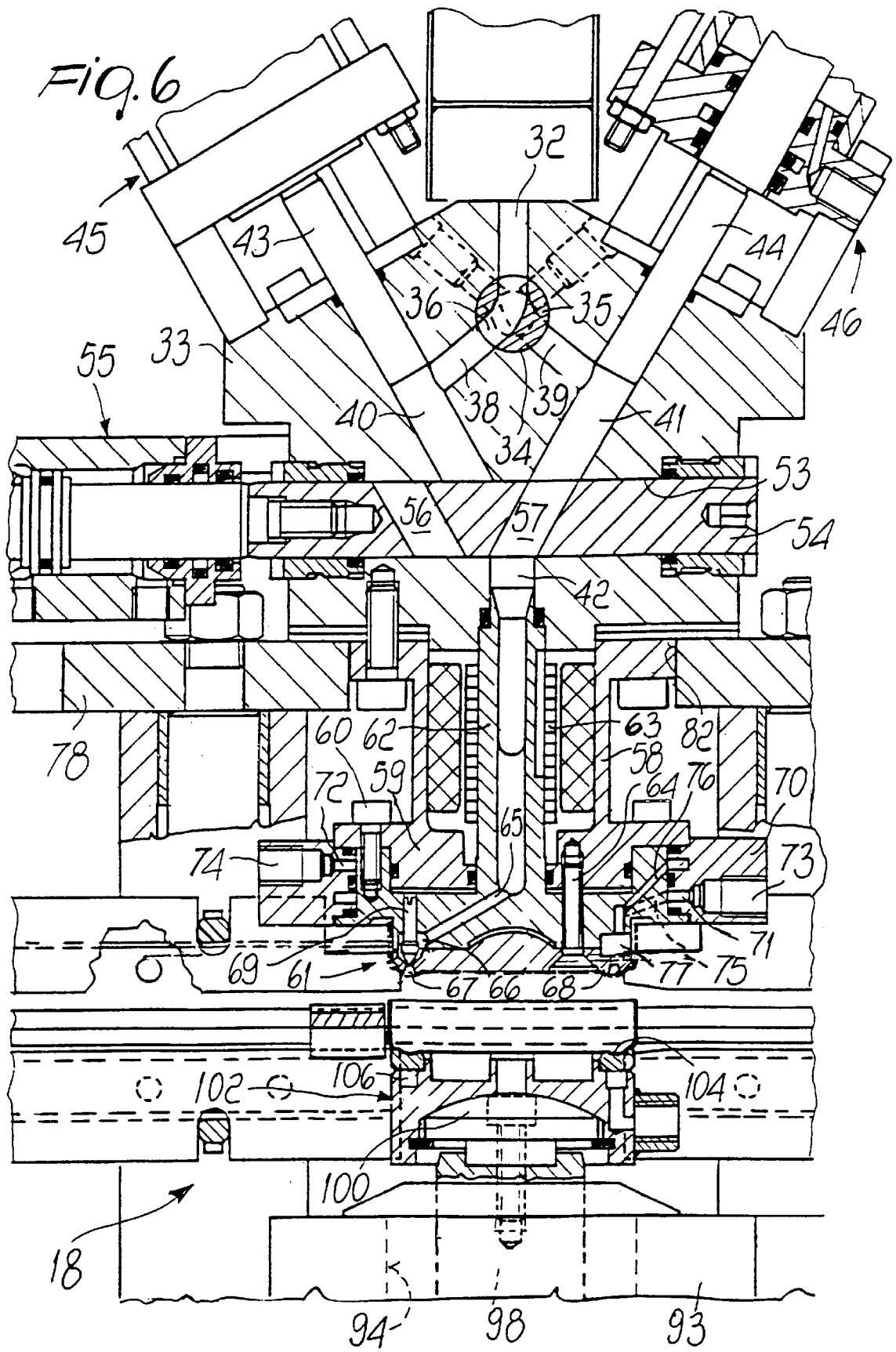
FIGS. 6 and 7 are enlarged-scale partial views of FIG. 4.
Figure 7:
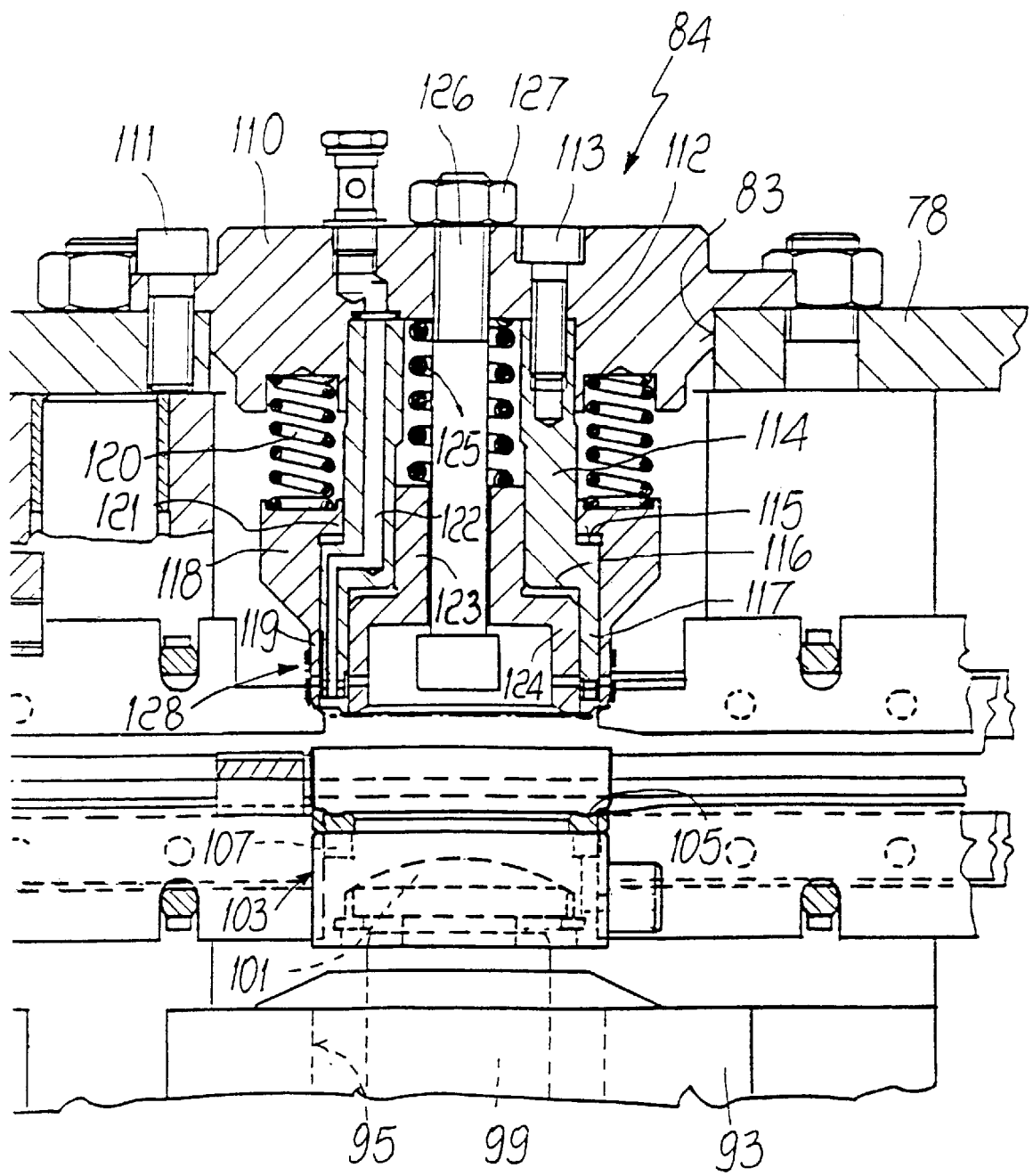

The upper portion of the belts 4 is horizontal and the pushers 5 move between the superimposed edges of lower and upper side walls 8, 9 (FIG. 5). The side walls 8, 9 are fitted parallel to the belts 4 on transverse bars 10, 11, so that it is possible to adjust their mutual distance. The opposite. ends of the bars 10, 11 are rigidly coupled to the lateral shoulders of the apparatus, generally designated by the reference numerals 12, 13.

Lower and upper strips 14, 15 are fitted on said bars 10, 11, but internally and parallel to the side walls 8, 9;

the mutually opposite edges of said strips, together with the side walls 8, 9, form a guide for the closures C during their advancement along the upper horizontal portion of the conveyor.

Figure 3:
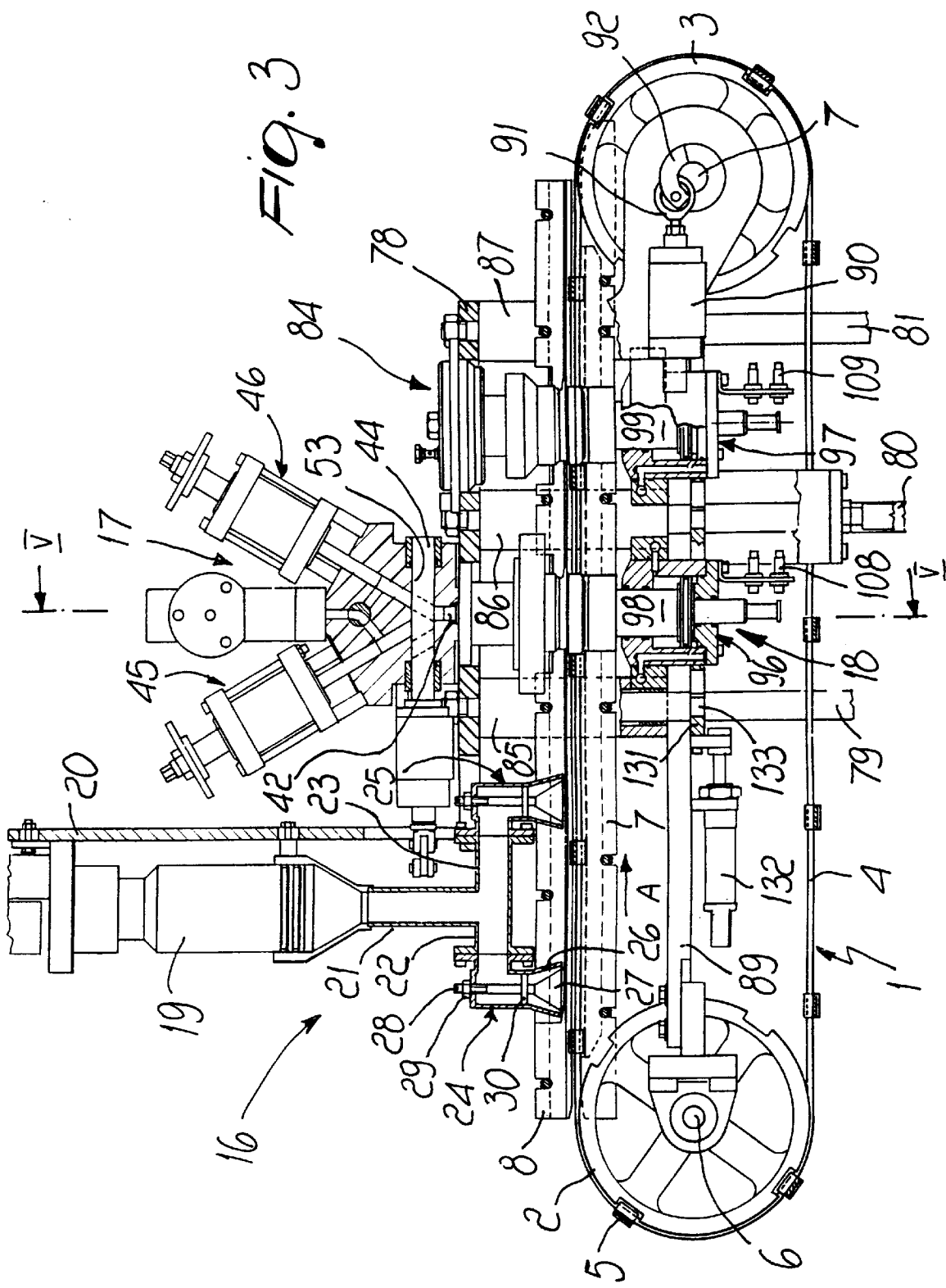
FIG. 3 is a vertical sectional side view of the apparatus according to a first embodiment.
Figure 4:
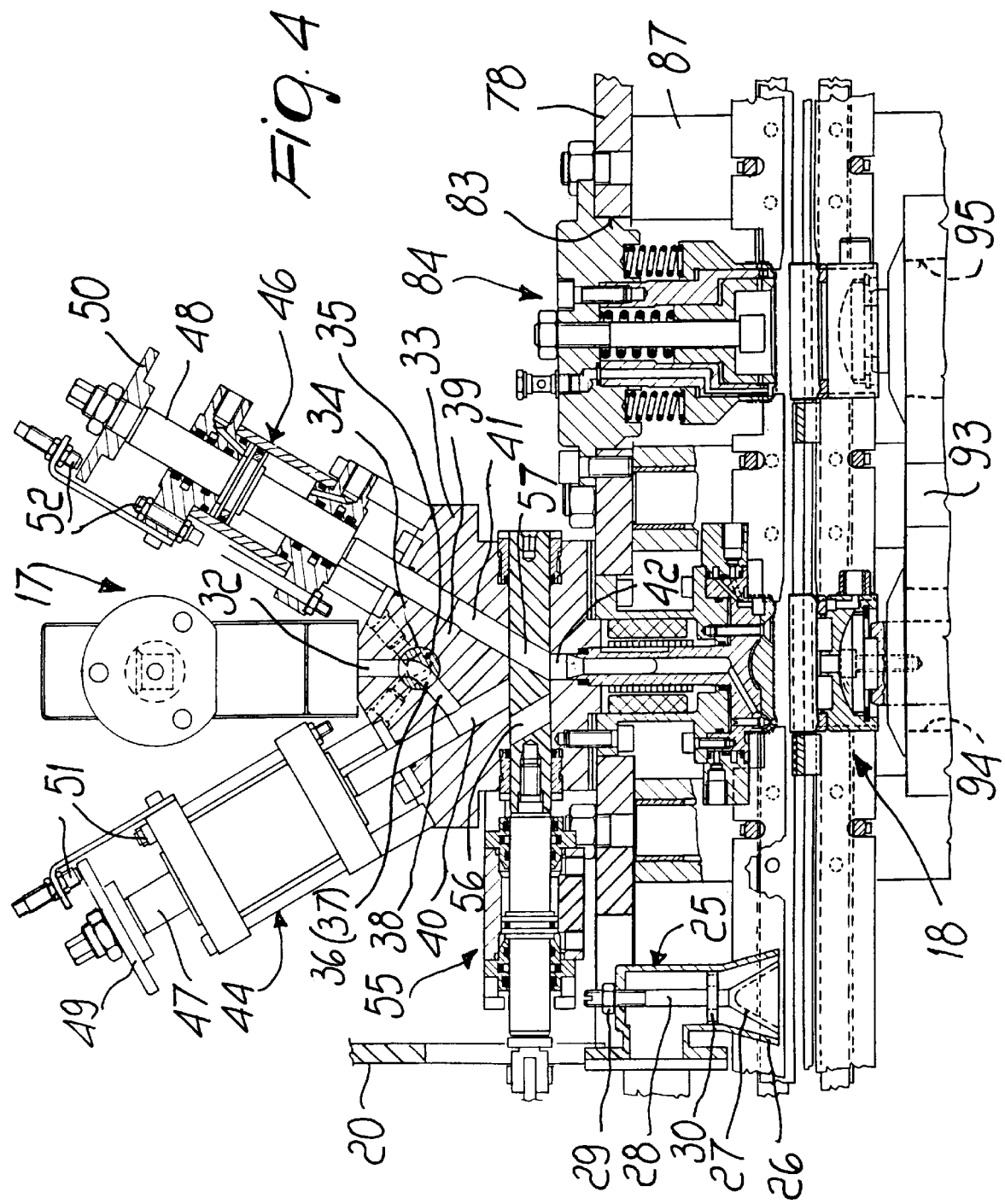
FIG. 4 is an enlarged-scale view of a portion of FIG. 3.

A station for heating the closures C, generally designated by the reference numeral 16 (FIG. 3), is arranged along the upper horizontal portion of the transfer conveyor 1; downstream of said station there is provided a station 17 for dispensing doses of plastic material in the pasty state as well as a preforming station 18 which in the preferred embodiment as seen particularly in FIG. 3 is located directly under the dispesing station 17 and is, constituted by a device for preforming said doses of plastic material inside the closures C in order to preform the seals G.

The heating station 16 comprises a hot air source 19, which is mounted on a wall 20 which rises from the shoulders 12, 13. The source 19 can be of any suitable kind. In the example, there is provided a source provided with a lower outlet, whereto a union shaped like an inverted T is connected; said union is composed of a vertical duct 21 which branches into two ducts 22, 23 which are mutually aligned and are directed respectively toward the upstream end and the downstream end of the upper portion of the belts 4.

The ducts 22, 23 end with hot air diffusers 24, 25; each diffuser is composed of a conical tube 26 which widens downward and of a conical plug 27 which is coaxially centered inside said tube. The plug 27 can be positioned axially inside the conical tube 26 so as to form, together with said tube, an annular opening having an adjustable gap for the outflow of hot air. In order to position the plug 27 there is provided a stem 28 which is rigidly axially coupled to the plug 27 and is provided with a threaded end portion, with which it protrudes outside through a hole of the ducts 22, 23 of the T-shaped union and whereon an adjustment nut 29 is screwed. Centering of the plug 27 inside the conical tube 26 is achieved by means of a flat disk 30, which is rigidly coupled to the stem 28, can slide in the tube 26, and has openings which allow the hot air to flow toward the outlet of the diffuser.

The dispensing station 17 is fed by a conventional extruder 31, in which the plastic material in the pasty state flows out through a nozzle 32 provided with an outflow opening which is directed downward. A prism-shaped body 33 is coupled to the nozzle 32 (FIGS. 4, 6) and a cylindrical hole 34, perpendicular to the nozzle 32 and to the plane of the belts 4, is formed therein.

A slide valve 35 of a cutoff and switching element can slide in the hole 34; two longitudinally offset passages 36, 37 are formed in said slide valve. The passages 36, 37 comprise a first portion, which leads vertically upward from the axis of the slide valve, and a second portion, which is connected to said first portion and runs obliquely downward from the axis of the slide valve. The oblique portion of one passage 36, 37 exits on one side and the oblique portion of the other passage exits on the opposite side of the slide valve 35 with respect to the centerline plane of said slide valve.

The slide valve 35, through the direct action of an actuator which is not shown in the drawings (for example a hydraulic or pneumatic cylinder), is shifted alternately between two positions, so as to alternately connect the nozzle 32 to the passage 36 or to the passage 37 and thus connect the nozzle 32 alternately to channels 38 or 39 formed in the body 33.

The passages 36, 37 diverge downward from the hole 34 and enter two respective cylindrical chambers 40, 41 which are formed in the body 33 and merge in a vertical duct 42.

Two stems 43, 44 of two fluid-actuated jacks 45, 46, mounted on the body 33 on opposite sides of the nozzle 32, can slide in the chambers 40, 41.

The stems 43, 44 act as plungers for the expulsion of the plastic material introduced in the chambers 40, 41 through the slide valve 35 and have portions 47, 48 which extend through the respective cylinders of the jacks 45, 46 and whereto elements 49, 50 are fixed which are suitable to activate inductive sensors 51, 52 which are rigidly coupled to the cylinders and are operatively connected thereto in order to produce the stroke of the stems 43, 44.

The chambers 40, 41 converge downward and are intersected by a horizontal cylindrical cavity 53, which constitutes the seat for the sliding of a slide valve 54 of an additional cutoff and switching element. The slide valve 54 is perpendicular to the slide valve 35 and is actuated with a reciprocating motion by a fluid-actuated actuator 55.

Two oblique passages 56, 57 are formed in the slide valve 54 in order to alternately connect the duct 42 to the chambers 40, 41. The distance and inclination of the passages 56, 57 are such that when one chamber 40 or 41 is connected to the duct 42 the slide valve 54 cuts off the connection of the other chamber to said duct 42.

A sleeve 58 is fixed below the body 33, concentrically to the duct 42, and ends with a ring 59 whereon a circular plate 61 is centered and fixed by means of screws 60, said circular plate having an outside diameter which is equal to the inside diameter of the closures C.

A sleeve 62 is centrally rigidly coupled to the circular plate 61 and enters the body 33 in order to connect hermetically to the duct 42. The sleeve 58 encloses, together with the sleeve 62, a circular compartment in which electric resistors 63 are arranged; said resistors are controlled so as to keep at the appropriate degree of plasticity the material which is dispensed by the extruder and is meant, as will become apparent hereinafter, to form the seals of the closures.

Channels 65 are formed in the circular plate 61 (which in the illustrated example is composed of two elements which are mutually joined by screws 64), extend radially from the central duct 42 and lead into chambers 66 formed proximate to the edge of the circular plate 61.

The chambers 66 are connected to the outside by means of respective openings which are angularly distributed with respect to the axis of the circular plate 61 and lead into an annular groove 67 formed in an annular protrusion 68 of the lower face of the circular plate 61. The openings are controlled by axially adjustable pins 69 which are screwed into threaded holes of the circular plate 61. The protrusion 68 is complementary to the annular recess D of the closure C, so that when the closure C rests against the circular plate 61, the groove 67 is closed by the closure C, forming an annular channel.

The circular plate 61 and the ring 59 have peripheral flanges between which a collar 70 is clamped. Two respective grooves 71, 72 are formed in the collar 70 and are connected to respective unions 73, 74 for feeding and discharging the liquid used for temperature control. The grooves 71, 72 are connected, by means of passages 75, 76, to a recess 77 formed in the peripheral region of the circular plate 61.

The heating station 16 and the dispensing station 17 are installed on a deck 78 (FIGS. 3, 4) which is rested and fixed horizontally at the top of pairs of posts 79, 80, 81 which are a part of the shoulders 12, 13 of the apparatus and between which the conveyor 1 lies.

The opening 82, through which the sleeve 58 protrudes, and another opening 83 (FIG. 7), for accommodating the upper part of a device that constitutes the station 84 for the final forming of the seal G, are formed in the deck 78.

Bushes 85, 86, 87 can slide on the pairs of posts 79–81; the ends of the bars 10, 11 are fixed to said bushes. The bushes 85–87 are mounted and fixed vertically on two respective longitudinal members 88, 89, at the opposite ends whereof the shafts of the pulleys 2, 3 are supported. The cylinder 90 of a fluid-actuated jack is articulated to the longitudinal member 89, and its stem 91 acts, like a connecting rod, on a crank 92 which is rigidly coupled to the shaft 7 of the pulleys 3. The stroke of the stem 91 is adjusted so that the belts 4 perform an advancement stroke which is equal to the pitch between the cross-members 5.

The longitudinal members 88, 89 are mutually connected by a cross-member 93 (see FIGS. 4, 6, 7) in which two seats 94, 95 are formed; said seats are coaxial to the openings 82 and 83 of the deck 78.

The seats 94, 95 accommodate the cylinders of two respective fluid-actuated jacks 96, 97 (FIG. 3) which can be connected to a source of pressure and have respective stems 98, 99 which protrude upward and downward. Respective spherical domes 100, 101 (see FIGS. 6, 7) are fixed to the upper end of the stems 98, 99, and respective flat disks 102, 103 are positioned and retained thereon by means of elastic rings. The flat disks 102, 103 are shaped, in their upper region, complementarily to the bottom of the closures C, i.e., they have a peripheral annular recess 104, 105.

Respective annular chambers 106, 107 are formed in the flat disks 102, 103, directly below the resting surface of the closures C, and are connected to the feed and to the discharge of a cooling fluid.

The lower ends of the stems 98, 99 of the jacks 96, 97 are shaped so that each one activates a pair of inductive sensors 108, 109 which are suitable to determine the stroke of the flat disks 102, 103.

A disk 110 is axially centered with respect to the jack 97 in the opening 83 and is fixed by means of screws 111. A cylindrical hollow 112 is formed in the disk 110 and a sleeve 114 is inserted therein and fixed by means of screws 113. The sleeve 114 is externally provided with an abutment shoulder 115 and internally forms a seat 116 which is enclosed by a cylindrical wall 117 whose diameter and thickness are such as to be complementary to the annular recess 105 of the flat disk 103.

A bush 118 is guided on the sleeve 114 and ends with a thinner portion 119 whose outside diameter is equal to the inside diameter of the closures C.

A plurality of springs 120 act between the disk 110 and the bush 118; said springs are distributed around the sleeve 114 and keep the bush 118, with an internal collar 121 thereof, in abutment against the shoulder 115, so that the edge of the bush protrudes beyond the edge of the wall 117. A hole 122 is formed in the thickness of the sleeve 114 and of the wall 117 and continues on one side until it ends at the edge of the wall 117 and, on the opposite side, through the disk 110 for connection to a source of compressed air.

A tubular tang 123 is guided in the sleeve 114 and has a cup-shaped portion 124 which is slidingly accommodated in the hollow 116 of the sleeve 114. Radial holes branch off from the hole 122 and lead outside and respectively inside through the tubular portion 119 and the cup-shaped portion 124. A spring 125 is accommodated in the sleeve 114, between the disk 110 and the tang 123, and acts on said tang, keeping the cup-shaped portion 124 in abutment against the head of a bolt 126 which is driven axially through the tang 123, the spring 125 and the disk 110. The position of the cup-shaped portion 124 inside the wider portion of the sleeve 114 is adjusted by acting on the nut 127 of the bolt 126, so that the edge of the cup-shaped portion 124, by means of the thrust applied by the spring 125, protrudes beyond the edge of the wall 117. From the above description it is evident that the cylindrical wall 117, the cup-shaped portion 124 and the portion 119 form a sort of punch, generally designated by the reference numeral 128, for molding the seal G.

In the described apparatus, the conveyor 1 and the elements associated therewith (jacks 96, 97, actuator 90) can be lowered with respect to the upper part (diffusers 24, 25, circular plate 61, punch 128) in order to allow cleaning and maintenance of the regions for the preforming and final forming of the seals. For this purpose, the conveyor 1 can be lowered and raised along the posts 79–81 by means of a jack 129 (FIG. 5) which acts on the longitudinal members 88, 89 by means of a frame 130 which connects said longitudinal members. The conveyor 1 can be locked in the raised position by a latch 131 (FIG. 3) which is slideably supported in the direction A by the longitudinal members 88, 89, is actuated by an actuator 132 and is suitable to engage grooves 133 of the posts 79–81.

Operation of the described apparatus is as follows. The closures C, by means of a feeder, not shown, are individually transferred onto the conveyor 1 and are pushed by the pusher cross-members 5 below the first hot air diffuser 24, where they undergo a first heating. With the subsequent advancement step, each closure arrives below the hot air diffuser 25, where it reaches the temperature that is sufficient to soften the layer of adhesive coating product with which closures are normally coated on the inside.

With the subsequent advancement of the conveyor, the closure arrives above the flat disk 102 of the preforming device 18, by which it is raised, through the action of the jack 96, until it superimposes on the circular plate 61. In this position, the bottom of the closure is in contact with the lower face of the circular plate 61, so as to close the groove 67.

At this point, by activating a jack 45, 46, a dose of plastic material is injected into the closure, enters the annular groove 67 and is distributed along the annular recess D of the closure.

After the dispensing of the dose of plastic material, the jack 96 is lowered again and compressed air is fed through the ducts 71–77, so that the closure C, with the dose of plastic material deposited thereon, separates from the circular plate 61 and remains rested on the flat disk 102. When the flat disk 102 is lowered by the jack 96, the closure is deposited on the conveyor 1. It should be noted that at the exit of the preforming device 18, the dispensed plastic material has already assumed a temporary annular configuration which has not set enough to form a seal.

Through the subsequent advancement of the conveyor by one pitch increment, the closure is positioned above the flat disk 103 of the final forming device 84 and then, by means of the activation of the jack 97, it is raised until it is superimposed on the punch 128. Since, as mentioned, the edges of the tubular portion 119 and of the cup-shaped portion 124 protrude beyond the edge of the wall 117, the engagement of the punch 128 in the closure C first of all causes the abutment of the edges of the tubular portion 119 and of the cup-shaped portion 124 against the bottom of the closure, outside and inside the recess D, so that the dose of plastic material applied in an annular shape in the previous station 18 remains between the tubular portion 119 and the cup-shaped portion 124.

Then, as the lifting stroke of the disk 103 continues, the cup-shaped portion 124 and the bush 118 are raised with respect to the sleeve 114 in contrast with the return action applied thereto by the springs 120, 125.

Accordingly, the dose of plastic material is compressed by the front edge of the wall 117 so as to occupy the entire annular compartment formed by the cup-shaped portion 124, by the tubular portion 119 and by the edge of the wall 117 which lies opposite the bottom of the closure C.

The pressure applied by the jack 97 and the cooling of the closure produced by feeding a cooling fluid through the ducts 107 of the flat disk 103 form, at the recess D, an annular seal, which the coating product softened by the heating of the station 17 and by the temperatures of the plastic material keeps perfectly adherent to the bottom of the closure.

When the flat disk 103 is then lowered and a cooling liquid is fed through the duct 122, the closure C is deposited on the conveyor 1 and removed with the subsequent advancement step. The operations are repeated at each advancement step of the conveyor 1 in the manner described above.

It should be noted that the slide valves 35 and 54 reverse their position for every seal that is molded inside the closure C, so that when one chamber (for example 41) is connected to the duct 42 through a corresponding passage (for example 57) of the slide valve 54, the other chamber (for example 40) is connected to the nozzle 32 through the passage (for example 38) of the slide valve 35. In this manner, the dispensing of the plastic material by the extruder is never interrupted despite the alternating operation of the preforming station.

The described apparatus is susceptible of numerous modifications and variations, all of which are within the scope of the same inventive concept.

Figure 8:
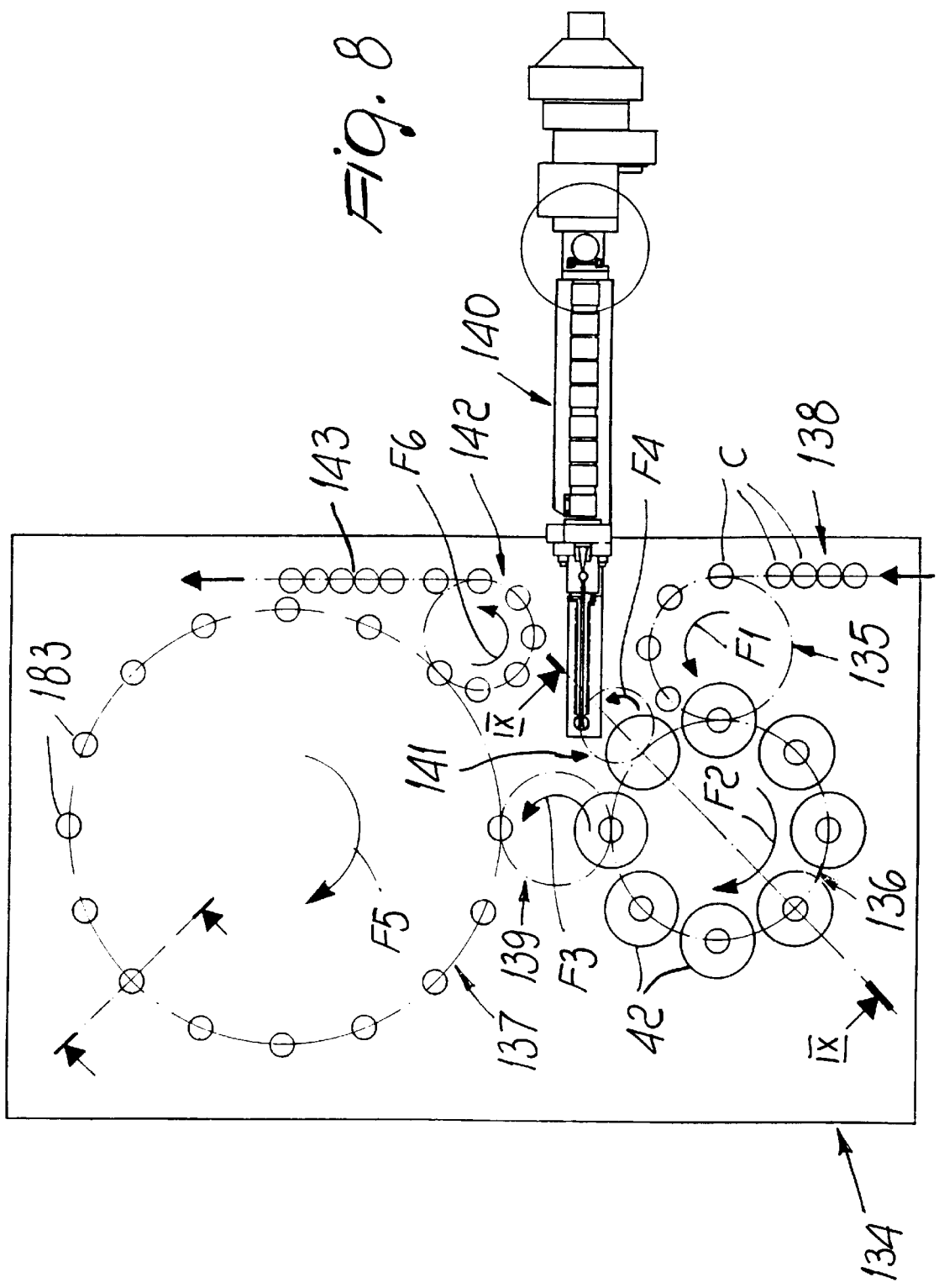
FIG. 8 is a schematic plan view of an apparatus according to a second embodiment of the invention.
Figure 9:
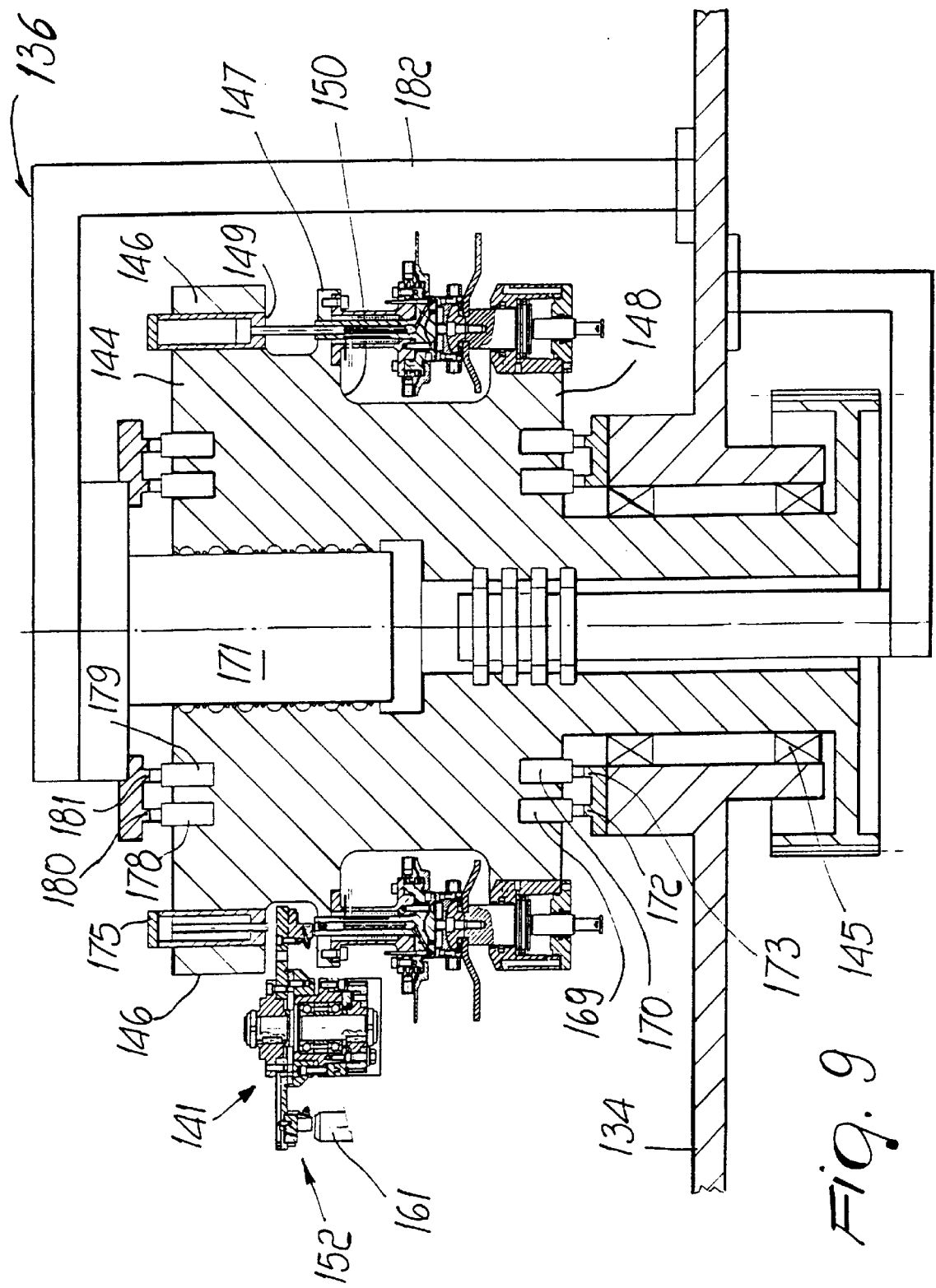
FIG. 9 is a sectional view, taken along the plane IX—IX of FIG. 8.
Figure 10:
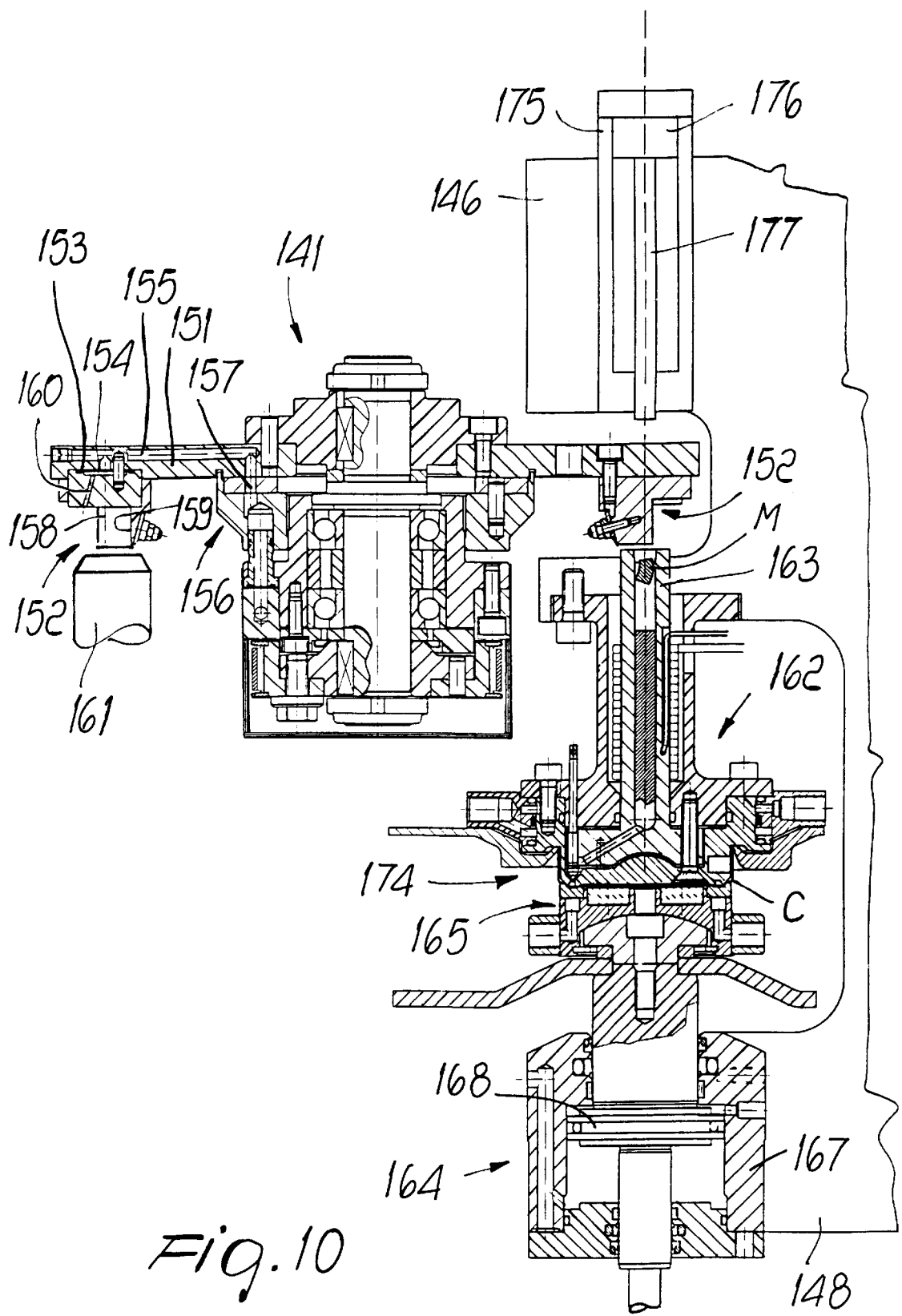
FIG. 10 is an enlarged-scale view of a portion of FIG. 9.

FIGS. 8, 9 and 10 illustrate a different embodiment in which the advancement of the closures is continuous instead of intermittent.

Before analyzing the apparatus in detail, in order to facilitate the understanding of its structure and operation, a summary description is given hereafter with reference to FIG. 8. In FIG. 8, the reference numeral 134 designates the footing of the apparatus, whereon three carousels 135, 136, 137 are mounted and rotate about vertical axes.

The carousel 135 is connected to a line 138 for feeding closures C to the carousel 135 which rotates in the counterclockwise direction F1. The carousel 135 has a star-shaped structure with peripheral seats for receiving the closures C from the feeder line 138 and for delivering them onto corresponding elements of the carousel 136, which rotates in the clockwise direction F2 and tangentially to the carousel 135. During the rotary travel of the carousel 135, the closures C are heated in order to facilitate adhesion of the doses of plastic material, which in the subsequent carousels 136, 137 are subjected to the final preforming and forming of the seal.

The preforming performed in the carousel 136 consists in dispensing, on the bottom of the closures C, a dose of plastic material in an annular shape. The closures provided with said preformed dose are transferred, by means of a star conveyor 139 that rotates in the counterclockwise direction F3, into the carousel 137, in which they are permanently transformed into seals. The doses of product required to form the seals are drawn from an extruder 140 by means of a removal star conveyor 141 which rotates in the counter-clockwise direction F4 and tangentially to the carousel 136, so as to deposit the doses of plastic material inside the closures C which are heated beforehand in the carousel 135 and transferred onto the carousel 136.

The carousel 137, by rotating in the clockwise direction F5, after receiving the closures from the carousel 136 by means of the star conveyor 139, delivers the closures to a transfer star conveyor 142 which rotates in the opposite direction F6. The star conveyor 142 is tangent to the carousel 137 at the end of a rotation arc along which the formation of the seal is completed. The star conveyor 142 finally conveys the closures onto a removal line 143.

In order to heat the closures C fed by the line 138, along the peripheral region of the carousel 135 there is provided a heating station which is identical to the one designated by the reference numeral 16 in the previously described example and is therefore not described further.

The star conveyor 141 for removing and dispensing the plastic material supplied by the extruder 140 is preferably of the type disclosed in International Patent Application PCT/EP95/01869 in the name of this same Applicant, to which reference is made here as an integral part of the apparatus according to the present invention.

The star conveyor 141 is arranged upstream of the point of tangency of the carousels 135 and 136, so that the doses taken from the extruder 140 can be deposited inside the closures heated in the carousel 135 and transferred onto the carousel 136. As shown more clearly by FIGS. 9–10, the preforming carousel 136 is composed of a drum 144 which is supported by bearings 145 in the footing 134 and is continuously rotated about a vertical axis by transmission means which are not shown. The drum 144 has three peripheral flanges 146, 147, 148, between which annular hollows 149, 150 are formed. The peripheral portion of the star conveyor 141 for removing the doses protrudes into the upper hollow 149; as described in International Patent Application PCT/EP95/01869, said star conveyor comprises a circular plate 151 (see FIG. 10) below which the elements 152 for removing and delivering the doses of plastic material to be molded are fixed; said elements are distributed concentrically at equidistant angles about the rotation axis of the star conveyor 141.

Each element 152 is composed of a disk 153 which is inserted hermetically in a respective recess of the circular plate 151, so as to form a compartment 154 which can be connected to a source of compressed air by means of a respective channel 155 formed radially in the thickness of the plate 151 and a distributor 156. The distributor 156, for each element 152, comprises a slot 157 which is capable of maintaining the connection of the compartment 154 of the removal element 152 that is in the hollow 149 during the rotation of the star 141 to the compressed air.

The disk 153 is retained in its recess of the circular plate 151 by a sort of semicylindrical bucket 158 provided with a concave portion 159 which opens in the direction of rotation F4. A plurality of holes 160 lead into the concave portion 159 and branch off from the compartment 154.

The lower edge of the buckets 158 is co-planar to the outlet of the nozzle 161 of the extruder 140, which differently from the one of the previously described example, is directed upward so that during the rotation of the star conveyor 141 each bucket 158 can remove from the nozzle 161 a dose of material that corresponds to the dose that flows out in the period between the passage of one bucket 158 and the next in front of the nozzle 161.

When a bucket 158 that has removed the dose is in the hollow 149 of the drum 144, the distributor 156 connects the holes 160 to the compressed air, causing the expulsion of the dose of plastic material removed by the bucket 158 and its projection into a respective device of a plurality of preforming devices 162 supported by the flanges 147, 148 concentrically to the rotation axis of the carousel 136.

As shown more clearly by FIG. 10, each device 162 is substantially identical to the device of the preforming station of the previous example; for the sake of brevity in description, only the sleeve 163, in which the dose M of plastic material conveyed by the star conveyor 141 is to be introduced, the circular plate 174 and the flat disk 165 of said forming station are designated in FIG. 10.

The axes of the sleeves 163 lie along a circumference which is tangent to the circumference along which the removal elements 152 move. The star conveyor 141 and the carousel 136 are furthermore mutually synchronized so that in their point of tangency a removal element 152 is aligned with a respective sleeve 163.

Seats are provided in the lower flange 148, coaxially to the sleeves 163, in order to accommodate respective fluid-actuated jacks 164 which can be connected to a source of pressure in order to lift and lower respective flat disks 165.

Each jack 164 comprises a cylinder 167, in which a piston 168 forms two chambers which can be connected to a source of a pressurized liquid by means of two distributors 169 and 170 and a rotating manifold 171. The connections between the jacks 164, the distributors 169, 170 and the rotating manifold 171 are not shown since they are fully conventional. The distributors 169, 170 are actuated by respective cams 172, 173 which act axially and are fixed to the footing 134 concentrically to the drum 144. The cams 172, 173 control the distributors 169, 170 so that the jacks 164 lift the flat disks 165 against the circular plates 174 downstream of the point of mutual tangency of the carousels 135 and 136 and lower them before the point of mutual tangency of the carousel 136 and the transfer star conveyor 139.

Seats are formed in the flange 146 (see FIG. 10) coaxially to the sleeves 163 and accommodate respective cylinders 175. Pistons 176 can slide in the cylinders 175 and have stems 177 that protrude downward. The stems 177 are coaxial to the sleeves 163 and their diameter is equal to the inside diameter of said sleeves.

Like the jacks 164, the pistons 176 form, in each cylinder 175, two chambers which can be connected to a source of a pressurized liquid by means of two distributors 178, 179 and passages of the rotating manifold 171. The two distributors 178, 179 are also actuated by means of respective axial cams 180, 181 which are supported by an arm 182 which is fixed to the footing and also supports the manifold 171.

When the pressurized liquid actuates the descent of the piston 176, the stem 177 enters the sleeve 163 and expels into the closure C (lifted beforehand by the flat disk 165 against the circular plate 174) a dose of plastic material which is molded in its final shape in the subsequent final formation carousel 137.

The carousel 137 is constituted by a drum which can rotate about a vertical axis. A plurality of angularly distributed forming devices 183 are arranged on the peripheral region of the drum to form the seal G. Each one of said devices, not shown in detail because they are fully similar to those designated by the reference numeral 84 in the previously described example, comprises an upper punch which is mounted on a flange of the drum and a jack which is mounted on a second flange of the drum and actuates a flat disk for lifting the closures which is coaxial to the punch.

Operation of the apparatus of FIGS. 8, 9, and 10 is as follows.

The closures C, fed by the line 138, are individually transferred onto the heating carousel 135, where they are heated so as to reach a temperature which is sufficient to soften the layer of coating product with which closures are normally coated internally and which has adhesive properties for retaining the seal.

In steady-state operating conditions, the doses M of plastic material are deposited, by means of the removal star conveyor 141, inside the sleeve 163 so as to fill it up to a preset level.

Through the subsequent rotation, the closure C passes above the flat disk 165 of the preforming carousel 136, whereby it is raised, through the action of the jack 164, until it is superimposed on the circular plate 174. In this position, the bottom of the closure is in contact with the lower face of the circular plate 174. At this point the descent of the stem 177 is actuated; by entering the sleeve 163, said stem injects into the lifted closure a dose of plastic material, which is distributed along the annular recess D of the closure.

After dispensing the dose of plastic material, the stem 177 is lifted again and the flat disk 165 is lowered again, so that the closure C, with the dose of plastic material deposited thereon, separates from the circular plate 174 and remains rested on the flat disk 165 until it exits from the carousel 136, i.e., until it is transferred onto the star conveyor 139.

It should be noted that through the preformation in the carousel 136, the plastic material expelled by the stem 177 has already assumed a temporary annular configuration which has not yet set completely.

With the subsequent rotation of the star conveyor 139, the closure is placed above the flat disk of the final forming carousel 137 and then lifted until it is superimposed on the corresponding punch.

The pressure applied by the jack and the cooling of the closure performed by the feeding of a cooling fluid through the ducts of the flat disk forms, at the recess D, an annular seal which is kept perfectly adherent to the bottom of the closure by the coating product that covers the bottom of the closure and had been softened by heating in the carousel 135 and by the temperatures of the plastic material.

By subsequently lowering the lower flat disk and by feeding compressed air through the punch, the closure C is deposited onto the lower flat disk and transferred onto the star conveyor 142 and then onto the removal line 143. The operations described above with reference to one closure are repeated cyclically for all incoming closures.

It should be noted that the stroke of the stems 177 is such that an amount of plastic material equal to the amount introduced by the dispensing star conveyor 141 in the sleeves 163 of the carousel 136 is injected into the closure.

What is claimed is:

1. An apparatus for molding a seal made of plastic material inside a closure for closing a container, comprising:

a closure heating station;

a transfer unit for transferring closures through said closure heating station;

a dispensing station for dispensing plastic material in pasty state, said dispensing station depositing a dose of material inside a respective closure which arrives from said heating station;

a preforming station comprising at least one preforming device, said preforming device preforming each dose dispensed inside each closure in an annular shape; and a final forming station comprising at least one forming device;

each said dose that has been preformed in the annular shape being molded in said forming device so as to form a final seal inside each said closure; said at least one forming device compring:

a punch which is composed of a sleeve, of a cup-shaped portion which is guilded inside said sleeve, and of a bush which is guided outside said sleeve;

elastic means which act on said bush and said cup-shaped portion and for keeping said cup-shaped portion and said bush in an abutment position whereat edges thereof protrude beyond an edge of said sleeve; a flat disk cooperating with said punch and being coaxial and movable with respect to the punch in order to lift a closure which has been transfered to said preforming device by said transfer unit and s se te closure on said punch, so as to insert said preformed seal in a groove formed between protruding edges of said bush and said cup-shaped portion and then perform a final forming of said preformed seal by lifting said bush and said cup-shaped portion with respect to said sleeve in contrast with action of said elastic means.

2. The apparatus according to claim 1, wherein said preforming device comprises:

a circular plate;

a central duct;

channels being formed at said plate, said channels extending from said central duct which is connected to the dose dispensing station;

chambers, to which said central duct leads and formed proximate to an edge of the circular plate;

openings of said chambers;

a groove, in which said openings lead, formed in a lower face of said circular plate;

adjustable pins for controlling said openings;

a coaxial flat disk, cooperating with said circular plate, and which is movable with respect thereto in order to raise a closure which has been transferred thereonto by said transfer unit and superimpose the closure on said circular plate so as to close said groove during dispensing of plastic material through said openings and so as to lower said closure after said material has filled said groove.

3. The apparatus according to claim 2, wherein said dispensing station comprises:

a body;

a hole which is formed in said body;

an extruder for extruding plastic material in the pasty state and having a nozzle which is connected to said hole;

first cutoff and switching elements, being accommodated in said hole and provided with two passages;

two chambers being alternately connectable with said passages;

respective stems slideable in said chambers;

jacks for actuating said stems, being mounted on said body; and a second cutoff and switching element;

said chambers being alternately connectable to said central duct of said circular plate through said second cutoff and switching element, said first cutoff and switching elements being actuated synchronously with respect to each other, so that when a first one of said chambers is connected to said central duct through said second element, a second one of said chambers is connected to said discharge nozzle of the extruder through said first element, whilst a first said element cuts off connection of said first chamber to said nozzle and said second element cuts off connection of said second chamber to said central duct.

4. The apparatus according to claim 2, wherein said flat disks of said preforming and forming devices have ducts for feeding a cooling fluid.

5. The apparatus according to claim 2, wherein said punch has ducts for feeding a cooling liquid into said closure.

6. The apparatus according to claim 2, wherein said flat disks of said preforming and forming devices have an annular recess for receiving an annular protrusion of said plate bottom.

7. The apparatus according to claim 1, wherein said heating station comprises a hot air source, and diffusers, connected to said hot air source, which have an adjustable jet for propellig an annular stream of hot air inside the closures.

8. An apparatus for molding a seal made of plastic material inside a closure for closing a container comprising:

a closure heating station;

a transfer unit for transfering closures throught said closure heating station;

a dispensing station for dispensing plastic material in pasty state, said dispensing station depositing a dose of material inside a respective closure which arrives from said heating station;

a preforming station comprising at least one preforming device, said preforming device preforming each dose dispensed inside each closure in an annular shape; and a final forming station comprising at least one forming device;

each said dose that has been preformed in the annular shape being molded in said forming device so as to form a final seal inside each said closure; said transfer unit comprising a conveyor which is composed of:

two flexible parallel elements which are close in a loop around respective pairs of pulleys;

a guide for said closures;

said parallel conveyor elements having a portion thereof that lies horizontally at sides of said guide; and cross-members for connecting said parallel elements, and for acting as pushers for said closures, said pushers being actuated intermittently with an advancement pitch which is equal to a pitch between said cross-members; and said heating station, said dispensing station, said preforming station and said final forming station for said seal being arranged at a mutual distance which is equal to the pitch of said cross-members.

9. The apparatus according to claim 2, comprising removal means comprising a star conveyor for removing and dispensing doses, said preforming station being fed by said star conveyor which deposits doses of plastic material in said central duct.

10. An apparatus for molding a seal made of plastic material inside a closure for closing a container, comprising:

a closure heating station;

a transfer unit for transferring closures through said closure heating station;

a dispensing station for dispensing plastic material in pasty state, said dispensing station depositing a dose of material inside a respective closure which arrives from said heating station;

a preforming station comprising at least one preforming device, said preforming device preforming each dose dispensed inside each closure in an annular shape; and a final forming station comprising at least one forming device;

each said dose that has been preformed in the annular shape being molded in said forming device so as to form a final seal inside each said closure; said preforming device comprising:

a circular plate;

a central duct;

channels being formed at said plate, said channels extending from said central duct which is connected to the dose dispensing station;

chambers, to which said central duct leads and formed proximate to an edge of the circular plate;

openings of said chambers;

a groove, in which said openings lead, formed in a lower face of said circular plate;

adjustable pins axially adjustably screwed to said circular plate and positioned for controlling said openings;

a coaxial flat disk, cooperating with said circular plate, and which is movable with respect thereto in order to raise a closure which has been transferred thereonto by said transfer unit and superimpose the closure on said circular plate so as to close said groove during dispensing of plastic material through said openings and so as to lower said closure after said material has filled said groove.

11. The apparatus according to claim 2, wherein said preforming and final forming stations are constituted by two carousels which are rotatable continuously about vertical axes thereof, a plurality of preforming devices and of final forming devices being respectively provided on said carousels, and a star conveyor being further provided for connecting the carousels and for transfering the closures therebetween.

12. The apparatus according to claim 11, wherein said preforming carousel comprises;

a drum which rotates about a vertical axis thereof; a plurality of preforming devices which are supported on said drum and are angularly distributed;

said dispensing station comprising, for each preforming device, a fluid-actuated cylinder, said cylinder being supported on said drum and having a stem thereof, said stem being coaxial to said central duct, and said cylinder being so actuated so as to enter said central duct and expel, through said openings, a dose of material introduced in said central duct by said removal means.

13. The apparatus according to claim 10, wherein said forming device comprises;

a punch which is composed of a sleeve, of a cup-shaped portion which is guided inside said sleeve, and of a bush which is guided outside said sleeve;

elastic, means which act on said bush and said cup-shaped portion and for keeping said cup-shaped portion and said bush in an abutment position whereat edges thereof protrude beyond an edge of said sleeve;

a flat disk cooperating with said punch and being coaxial and movable with respect to the punch in order to lift a closure which has been transferred onto said circular plate by said transfer unit and superimpose the closure on said punch, so as to insert said preformed seal in a groove formed between protruding edges of said bush and said cup-shaped portion and then perform a final forming of said preformed seal by lifting said bush and said cup-shaped portion with respect to said sleeve in contrast with action of said elastic means.

* * * * *